O. F. KOHLWEY.
DRIVING ATTACHMENT FOR CREAM SEPARATORS.
APPLICATION FILED APR. 26, 1909.
990,881.
Patented May 2, 1911.
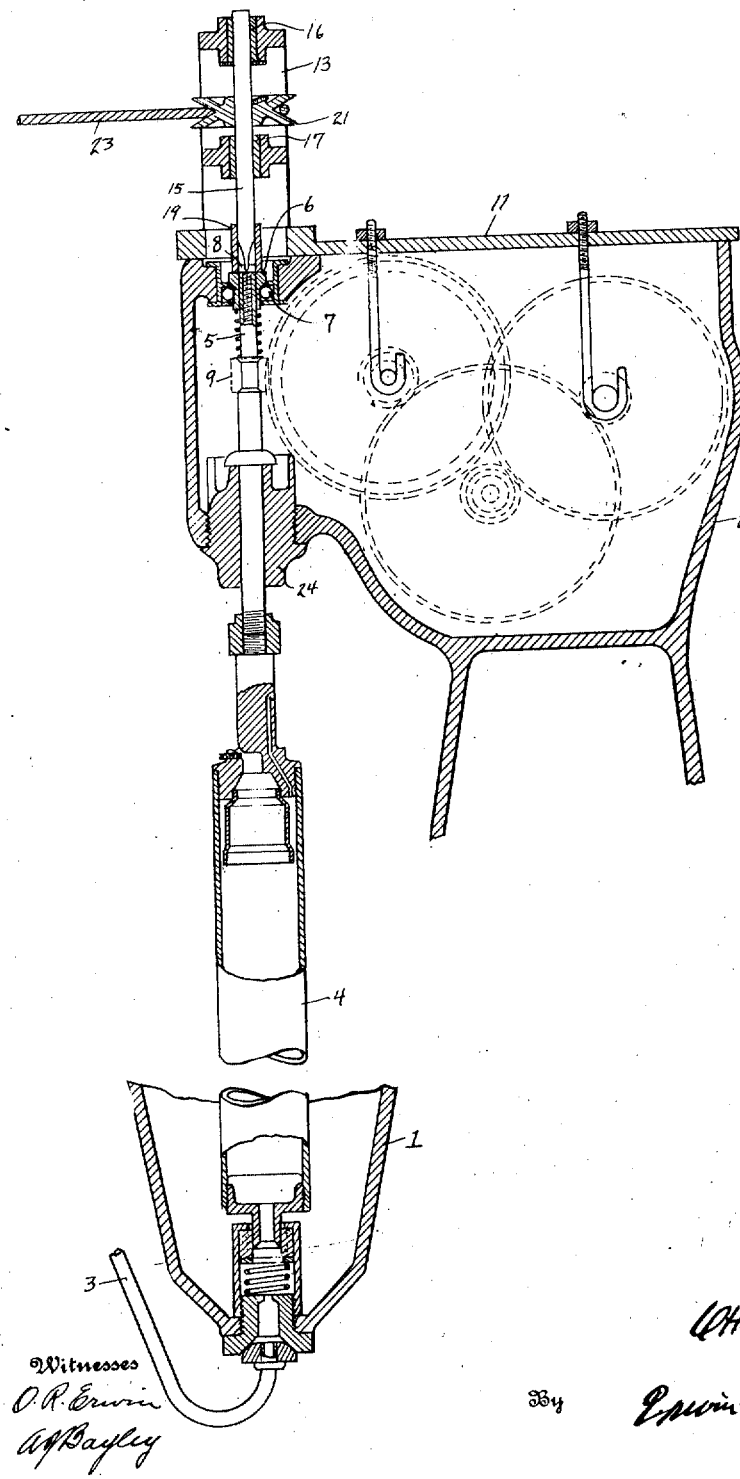

UNITED STATES PATENT OFFICE.

OTTO F. KOHLWEY, OF GRAFTON, WISCONSIN.

DRIVING ATTACHMENT FOR CREAM-SEPARATORS.

990,881.  Specification of Letters Patent.  Patented May 2, 1911.

Application filed April 26, 1909. Serial No. 492,262.

*To all whom it may concern:*

Be it known that I, OTTO F. KOHLWEY, a citizen of the United States, residing at Grafton, county of Ozaukee, and State of Wisconsin, have invented new and useful Improvements in Driving Attachments for Cream-Separators, of which the following is a specification.

My invention relates to improvements in driving connections for cream separators of that class in which the bowl supporting spindle is suspended from the upper end. Such spindles are ordinarily driven manually through crank and gearing connections, and the object of my invention is to provide means whereby such connections may be used interchangeably with driving connections actuated by mechanical power.

In the following description, reference is had to the accompanying drawing, in which the figure is a vertical sectional view, drawn on the axis of the spindle and longitudinally of the gear casing, showing my improved power driving connections applied thereto, and with dotted lines indicating the position of some of the manually actuated gearing, which is removed when the spindle is driven by mechanical power.

1 is the bowl casing and 2 the gear casing of the separator.

3 is the supply pipe, 4 the separating bowl and 5 the bowl supporting spindle, suspended by a head 6 upon ball bearings 7. The head 6 is secured to the end of the spindle by a screw 8, having the ordinary cross groove or channel, and when driven manually, the power is applied to the spindle through a pinion at 9 and manually actuated gears located in the casing 2.

When it is desired to drive the separator by mechanical power, the cap of the gear casing 2 is removed and a cap 11 substituted, which is provided with an upwardly extending standard 13, supporting a vertically disposed auxiliary driving shaft 15 in bearings at 16 and 17. This shaft 15 is flattened and tapered at its lower end, the form being similar to that of a screw driver, adapted to engage the head of the screw 8. A bushing 19 is fitted to, but loose on the shaft and at its lower end, and is adapted to loosely fit over the head of the screw, when the shaft supporting attachment is in operative position. This bushing holds the auxiliary shaft in alinement with the spindle. A driving pulley 21 is fast on the shaft and is actuated by a belt or chain 23. The separator can thus be driven by mechanical power and substitution of such power for manual power can be made without disarranging any of the working parts of the separator or interfering with the free running movement secured in such separators by suspending the spindle from its upper end. The bearing 24 in the lower portion of the casing is a loose guide bearportion of the casing is a loose guide bearing.

Having thus described my invention, what I claim as new, and desire to secure by Letters Patent, is—

1. In a cream separator, the combination of a suspended bowl supporting separator spindle provided with a transverse groove at its upper end, of a gear casing, removable gearing therein for actuating said spindle, a removable cap for said casing, provided with a bearing standard, and an auxiliary shaft journaled in said standard and provided with driving connections exterior to said casing, said auxiliary shaft being flattened and tapered at its lower end and adapted to engage in said transverse groove, whereby said spindle may be driven either by means of the interior removable gearing, or by the exterior auxiliary shaft.

2. In a cream separator, the combination of a suspended bowl supporting separator spindle provided with a transverse groove at its upper end, of a gear casing, removable driving connections therein, a removable cap for the casing, provided with a bearing standard, and an auxiliary shaft journaled in said standard and provided with driving connections, said auxiliary shaft being flattened and tapered at its lower end, and adapted to engage in said transverse groove, together with a bushing loosely fitted to the auxiliary shaft and covering the tapered portion, with its lower end loosely engaging the end of the spindle.

In testimony whereof I affix my signature in the presence of two witnesses.

OTTO F. KOHLWEY.

Witnesses:
LEVERETT C. WHEELER,
O. R. ERWIN.